United States Patent
Manges

(10) Patent No.: US 10,218,687 B2
(45) Date of Patent: *Feb. 26, 2019

(54) DIFFERENTIAL CLIENT-SIDE ENCRYPTION OF INFORMATION ORIGINATING FROM A CLIENT

(71) Applicant: PAYPAL, INC., San Jose, CA (US)

(72) Inventor: Daniel Manges, Chicago, IL (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,462

(22) Filed: Aug. 21, 2017

(65) Prior Publication Data

US 2018/0063104 A1 Mar. 1, 2018

Related U.S. Application Data

(63) Continuation of application No. 15/205,384, filed on Jul. 8, 2016, now Pat. No. 9,742,747, which is a (Continued)

(51) Int. Cl.
*H04L 29/06* (2006.01)
*H04L 9/14* (2006.01)
(Continued)

(52) U.S. Cl.
CPC .......... *H04L 63/061* (2013.01); *H04L 9/0816* (2013.01); *H04L 9/14* (2013.01);
(Continued)

(58) Field of Classification Search
CPC ............. H04L 63/0428; H04L 63/0435; H04L 63/0442; H04L 63/045; H04L 63/0471;
(Continued)

(56) References Cited

U.S. PATENT DOCUMENTS

| 5,978,840 A | 11/1999 | Nguyen et al. |
| 5,987,140 A | 11/1999 | Rowney et al. |

(Continued)

FOREIGN PATENT DOCUMENTS

WO   WO 01/08346   2/2001

OTHER PUBLICATIONS

"Turning mobile shopping trends into mobile buying trends", AFFIRM, 5 pages [online], [retrieved on Jul. 19, 2013]. Retrieved from the Internet: <URL: https://www.affirm.com/help>.

(Continued)

*Primary Examiner* — Minh Dinh
(74) *Attorney, Agent, or Firm* — Haynes and Boone, LLP

(57) ABSTRACT

A method may include allocating a number of public keys, where each respective public key is allocated to a respective entity of a number of entities; storing a number of private keys, where each respective private corresponds to a respective public key; storing one or more decryption algorithms, where each respective decryption algorithm is configured to decrypt data previously encrypted using at least one encryption algorithm of the encryption algorithms. Each respective encryption algorithm may be configured to encrypt data using at least one public key. Each respective decryption algorithm may be configured to decrypt data using at least one private key. The method may include receiving encrypted data, where the encrypted data is encrypted using a first public key and a first encryption algorithm, and the encrypted data is provided over a network.

20 Claims, 7 Drawing Sheets

Related U.S. Application Data continuation of application No. 14/677,867, filed on Apr. 2, 2015, now Pat. No. 9,391,963, which is a continuation of application No. 14/103,038, filed on Dec. 11, 2013, now Pat. No. 9,009,462, which is a continuation of application No. 13/633,106, filed on Oct. 1, 2012, now Pat. No. 8,631,229.

(60) Provisional application No. 61/541,875, filed on Sep. 30, 2011.

(51) Int. Cl.
*H04L 29/08* (2006.01)
*H04L 9/08* (2006.01)

(52) U.S. Cl.
CPC ...... *H04L 63/0428* (2013.01); *H04L 63/0435* (2013.01); *H04L 63/0442* (2013.01); *H04L 63/0471* (2013.01); *H04L 67/34* (2013.01); *H04L 63/06* (2013.01); *H04L 63/205* (2013.01)

(58) Field of Classification Search
CPC ..... H04L 63/06; H04L 63/061; H04L 63/205; H04L 9/0816; H04L 9/14; H04L 67/34; H04L 2209/56; H04L 2463/102; G06Q 20/3823; G06Q 20/40; G06Q 20/401; G06Q 20/409
See application file for complete search history.

(56) References Cited

U.S. PATENT DOCUMENTS

| | | | |
|---|---|---|---|
| 6,072,870 | A | 6/2000 | Nguyen et al. |
| 6,247,129 | B1 | 6/2001 | Keathley et al. |
| 7,203,839 | B2 | 4/2007 | Richards, Jr. et al. |
| 7,350,081 | B1 | 3/2008 | Best |
| 8,423,457 | B1 | 4/2013 | Schattauer et al. |
| 2002/0184485 | A1 | 12/2002 | Dray, Jr. et al. |
| 2004/0111360 | A1 | 6/2004 | Albanese |
| 2005/0084100 | A1 | 4/2005 | Spies et al. |
| 2006/0016880 | A1 | 1/2006 | Singer et al. |
| 2008/0011825 | A1 | 1/2008 | Giordano et al. |
| 2009/0083542 | A1 | 3/2009 | Craft et al. |
| 2009/0182674 | A1 | 7/2009 | Patel et al. |
| 2012/0084204 | A1 | 4/2012 | Castell et al. |
| 2012/0150748 | A1 | 6/2012 | Law et al. |
| 2012/0239777 | A1 | 9/2012 | Rosati et al. |
| 2013/0346310 | A1 | 12/2013 | Burger et al. |

OTHER PUBLICATIONS

Alvarez, Edgar, "MasterCard announces MasterPass digital banking service, gives Australia and Canada first dibs", engadget, Feb. 25, 2013, 7 pages [online], [retrieved on Jul. 19, 2013]. Retrieved from the Internet: <URL:http://www.engadget.com/2013/02/25/mastercard-masterpass-payments/>.

Buhan et al., "Mobile Payments in M-Commence", Telecom Media Networks, Sep. 2002, Paris, France.

Perez, Sarah, "Death by a Thousand Cuts? Google Wallet's Plan to Take on PayPal Leverages Chrome, Android, Google+, Gmail & More", TechCrunch, May 15, 2013, 4 pages [online], [retrieved on Jul. 19, 2013]. Retrieved from the Internet: <URL: http://techcrunch.com/2013/05/15/death-by-a-thousand-cuts-google-wallets-plan-to-take-on-paypal-leverages-chrome-android-google-gmail-more/ >.

Greenfield, Rebecca, "There's Finally a Reason to be Jealous of Clinkle's $25 Million Stanford Dropouts", The Atlantic Monthly Group, Jul. 2, 2013, 2 pages [online], [retrieved on Jul. 19, 2013]. Retrieved from the Internet: <URL: http://www.theatlanticwire/com/technology/2013/07/what-is-clinkle/66792 >.

International Preliminary Report on Patentability, PCT/US12/58371, dated Sep. 27, 2013, 9 pages.

Note on Informal Communication With the Applicant, Sep. 16, 2013, 1 page.

O'Brien, Terrence, Mastercard Introduces PayPass Wallet Services, Online and API at CTIA 2012, engadget, May 7, 2012, 2 pages [online], [retrieved on Jul. 19, 2013]. Retrieved from the Internet: <URL: https://www.engadget.com/2012/05/07/mastercard-introduces-paypass-wallet-services-online-and-api-at/>.

O'Mahony et al., "Electronic Payment Systems", Artech House Computer Science Library, Jun. 1997, pp. 92-123, First Edition, Artech House Publishers, Norwood, Massachusetts.

"Paypal iOS SDK", PayPal Developer, 4 pages [online], [retrieved on Jul. 19, 2013]. Retrieved from the Internet: <URL:https:developer.paypal.com/webapps/developer/docs/integration/mobile/ios-interation-guide>.

PCT/US12/58371, Form PCT/ISA/206, Nov. 9, 2012, 2 pages.

PCT/US12/58371, International Search Report and Written Opinion, dated Feb. 1, 2013, 16 pages.

Resubmittal—Amendment of International Application Under Article 34, Sep. 26, 2013, 21 pages.

"Global Payments confirms support for V.me by Visa New processor opens up its-e-commerce merchant portofolio to the V.me by Visa digital wallet service", Visa Europe, Apr. 4, 2013, 1 page, London.

"Nationwide to offer V.me by Visa to customers in 2013", Visa Europe, Feb. 12, 2013, 1 page, London.

"V.me by Visa adds Dixons Retail to its digital wallet service", Visa Europe, Jun. 24, 2013, 3 pages, London.

"Introducing V.me by Visa. Secure, simple and fast online payments Available in the UK, France and Spain", V.me by Visa, 4 pages, [online], [retrieved on Jul. 19, 2013]. Retrieved from the Internet: <URL: https://uk.v.me/media.main.aspx>.

"Visa Europe confirms launch date for V.me digital wallet WorldPay announced as key UK development partner", Visa Europe, Apr. 30, 2012, 1 page, London.

Visa Europe confirms RBS as launch partner for V.me by Visa, Visa Europe, Nov. 28, 2012, 1 page, London.

Schneier, Applied Cryptography, 1996, John Wiley & Sons, $2^{nd}$ Edition, pp. 31-34.

DIFFERENTIAL CLIENT-SIDE ENCRYPTION OF INFORMATION ORIGINATING FROM A CLIENT

CROSS-REFERENCE TO RELATED APPLICATIONS

This application is a continuation of U.S. patent application Ser. No. 15/205,384, filed Jul. 8, 2016, which is a continuation of U.S. patent application Ser. No. 14/677,867, filed Apr. 2, 2015, now U.S. Pat. No. 9,391,963, which is a continuation of Ser. No. 14/103,038, filed Dec. 11, 2013, now U.S. Pat. No. 9,009,462, which is a continuation of U.S. patent application Ser. No. 13/633,106, filed Oct. 1, 2012, now U.S. Pat. No. 8,631,229, which claims priority to U.S. Provisional Patent Application No. 61/541,875, filed Sep. 30, 2011, all of which are incorporated herein by reference in their entirety.

BACKGROUND

Information such as personal data and other sensitive information may be passed across a network such as the Internet, for example to provide credential information, payment information, or personal account management information. To protect sensitive information, the information can be transmitted over a secure transmission connection, such as Transport Layer Security (TLS) or Secure Socket Layer (SSL).

To secure information from unauthorized review, the information can be digitally encrypted. One example of digital encryption is public key cryptography. In the public key cryptography scheme, two separate but mathematically-connected keys (e.g., numeric values) are used to secure the information. The first, a public key, is used to encrypt the data using an encryption algorithm. The second, a private key, can be used by the receiver of the data to decrypt the encrypted information. The receiver supplies the sender with the public key such that the sender is capable of securely transmitting information to the receiver.

The receiver of sensitive information may be obligated to secure the privacy of the user from unauthorized access to the sensitive information. Information may be sensitive if the information is confidential (e.g., industry and/or professional standards indicate that only designated parties should have access to the information). Information may be sensitive if a party incurs regulatory obligations for handling the information due to exposure to the information. Information may be sensitive if a party incurs potential liability due to handling of and/or exposure to the information.

The receiver of the sensitive information, in some circumstances, may request the sensitive information from the user, not for use by the requestor, but for processing by a third party, such as a credit card system or a health insurance authorization system. There is a desire for a method and apparatus capable of enabling the conveyance of sensitive information through the system of the requestor without the requestor having access to the contents of the conveyance. If the requestor is incapable of rendering and/or interpreting the sensitive information, the requestor may avoid obligation to protect the sensitive information.

SUMMARY

In one aspect, the present disclosure is directed to a method including allocating, by a processor of a first computing device, a number of public keys, where each respective public key of the number of public keys is allocated to a respective entity of a number of entities. The method may include storing, in a memory of the first computing device, a number of private keys, where each respective private key of the number of private keys corresponds to a respective public key of the number of public keys. The method may include storing, in the memory of the first computing device, one or more decryption algorithms, where each respective decryption algorithm of the one or more decryption algorithms is configured to decrypt data previously encrypted using at least one encryption algorithm of one or more encryption algorithms. Each respective encryption algorithm of the one or more encryption algorithms may be configured to encrypt data using at least one public key of the number of public keys. Each respective decryption algorithm of the one or more decryption algorithms may be configured to decrypt data using at least one private key of the number of private keys. The method may include receiving encrypted data, where the encrypted data is encrypted using a first public key of the number of public keys and a first encryption algorithm of the one or more encryption algorithms, and the encrypted data is provided over a network. The method may include determining, by the processor of the first computing device, a first private key of the number of private keys, where the first private key corresponds to the first public key, and the first public key is allocated to a first entity of the number of entities. The method may include decrypting, by the processor of the first computing device, the encrypted data using the first private key and at least one decryption algorithm of the one or more decryption algorithms, where decrypted data is obtained by decrypting the encrypted data. The method may include providing a portion of the decrypted data for processing by a processing engine, where a second computing device includes the processing engine. The method may include receiving a processing result generated by the processing engine, where the processing result relates to the portion of the decrypted data. The method may include providing, over the network, the processing result to the first entity.

In some embodiments, the method may further include, prior to providing the portion of the decrypted data for processing by the processing engine, queuing, by the processor of the first computing device, the decrypted data for processing.

The method may further include, prior to receiving the encrypted data, receiving a download request for the first encryption algorithm, where the download request is received across the network from a third computing device, and providing the first encryption algorithm, via the network, to the third computing device. The download request may include a hypertext transfer protocol request. The method may include storing, in the memory of the first computing device, the one or more encryption algorithms as one or more encryption subprograms, where providing the first encryption algorithm includes providing a first encryption subprogram of the one or more encryption subprograms, where the first encryption subprogram includes the first encryption algorithm. The first encryption subprogram may include runtime interpreted instructions.

In some embodiments, the method may include storing at least one of the decrypted data and the encrypted data in a storage archive accessible to the first computing device. The method may include receiving, over the network, unencrypted data, where the unencrypted data is related to the encrypted data, and providing a portion of the unencrypted data for processing by the processing engine, where the portion of the unencrypted data is provided with the portion of the decrypted data.

In some embodiments, the method may further include receiving, over the network, an indication of a type of processing to be performed on the encrypted data, where the indication of the type of processing is provided by a third computing device controlled by the first entity. The type of processing may include at least one of a credit card authorization and a background check. The encrypted data may include one or more of credit card information, medical history information, Social Security number, bank account number, and driver's license number. The encrypted data may be provided over the network from a third computing device controlled by the first entity, and the first entity may be incapable of decrypting the encrypted data.

In one aspect, the present disclosure describes a method including storing, in a memory of a first computing device, one or more encryption algorithms; providing, to a requestor across a network, a first encryption algorithm of the one or more encryption algorithms; and storing, in the memory of the first computing device, one or more decryption algorithms, where each respective decryption algorithm of the one or more decryption algorithms is configured to decrypt data previously encrypted using at least one encryption algorithm of the one or more encryption algorithms. The method may include receiving a processing request, where the processing request includes encrypted data, non-encrypted data, and an indication of a type of processing to be performed, where the processing request is provided over a network from a second computing device controlled by an entity, and the encrypted data is encrypted using the first encryption algorithm. The method may include determining, by a processor of the first computing device, that the encrypted data is associated with the entity; determining, by the processor of the first computing device, a first decryption algorithm of the one or more decryption algorithms; decrypting, by the processor of the first computing device, the encrypted data using the first decryption algorithm, where decrypted data is obtained by decrypting the encrypted data; determining, by the processor of the first computing device, a processing engine configured to process the decrypted data using the type of processing; and providing, via a second network, a portion of the decrypted data and a portion of the unencrypted data to a third computing device, where the third computing device includes the processing engine. The method may include receiving a processing result from the third computing device, and providing the processing result to the second computing device.

In some embodiments, the first encryption algorithm may be an asymmetrical encryption algorithm. The method may further include allocating, by the processor of the first computing device, a public key to the entity; providing the public key to the second computing device, where the encrypted data is encrypted using the public key; and storing, in the memory of the first computing device, a private key. The private key may be paired with the public key, and decrypting the encrypted data may include decrypting using the private key.

In one aspect of the present disclosure, a method may include storing, in a memory of a first computing device, one or more encryption algorithms as one or more encryption subprograms; receiving, via a network, a download request for a first encryption subprogram of the one or more encryption subprograms; providing, via the network, the first encryption subprogram; and receiving, via the network, a processing request, where the processing request includes encrypted data, where the encrypted data is encrypted using the first encryption subprogram. The method may include determining, by a processor of the first computing device, that the encrypted data is associated with an entity; determining, by the processor of the first computing device, a first decryption algorithm, wherein the first decryption algorithm is configured to decrypt the encrypted data; and decrypting, by the processor of the first computing device, the encrypted data using the first decryption algorithm, where decrypted data is obtained by decrypting the encrypted data. The method may include determining, by the processor of the first computing device, a processing engine for processing the decrypted data; providing, via a second network, a portion of the decrypted data to a second computing device, where the second computing device includes the processing engine; receiving a processing result from the second computing device; and providing, across the network, to a third computing device, the processing result, where the third computing device is controlled by the entity.

The processing request may be received from the third computing device. The processing result may include an indication of at least one of approval and denial. The download request may be received from a fourth computing device controlled by an end user, where the fourth computing device is different from the second computing device and the third computing device.

In one aspect, the present disclosure describes a method including receiving a public key allocated by a service provider for use by an entity, where the service provider maintains a private key paired to the public key; determining, by a processor of a first computing device, an interactive program including the public key; and providing the interactive program for an end user, where the interactive program is configured to enable a processor of a second computing device to encrypt data using the public key, where the second computing device is controlled by the end user. The method may include receiving encrypted data from the second computing device, across a first network, where the processor of the second computing device encrypted the encrypted data using the public key; forwarding the encrypted data to the service provider, across a second network, where the service provider is configured to determine the private key and decrypt the encrypted data, and the first computing device lacks access to the unencrypted data; and receiving, from the service provider, a processing result related to the decryption of the encrypted data.

The interactive program may be a mobile computing device application, and the second computing device may be a mobile computing device, where the mobile computing device application is configurable to install upon the processor of the second computing device.

The interactive program may contain instructions that, when executed, cause the processor of the second computing device to encrypt data using the public key. The interactive program may contain instructions that, when executed, further cause the processor of the second computing device to download an encryption subprogram from one of the entity and the service provider. The interactive program may include instructions capable of being rendered within an Internet browser application. The method may further include providing result information to the second computing device, where the result information is configured for presentation upon a display of the second computing device.

In one aspect, the present disclosure describes a method including receiving one or more encryption algorithms and a public key, where the one or more encryption algorithms are configured to encrypt data using the public key to obtain encrypted data, where the encrypted data is configured to be decrypted using a private key paired with the public key, and the one or more encryption algorithms and the public key are provided by a service provider over a network, where the service provider allocated the public key for use by an entity, and the service provider stores the private key. The method may include generating, by a processor of a first computing device, a mobile device application including the one or more encryption algorithms and the public key; providing the mobile device application for download over the network; and receiving encrypted data, where the data is encrypted by the one or more encryption algorithms and the public key by a processor of a mobile computing device, where the mobile device application is installed upon the mobile computing device. The method may include forwarding the encrypted data to a second computing device, where the second computing device is controlled by the service provider, and the service provider is configured to decrypt the encrypted data to obtain decrypted data, and manage processing of the decrypted data to obtain a processing result. The method may include receiving, from the second computing device, the processing result.

In some embodiments, the method may further include generating, by a processor of a third computing device, result information, where the result information is based upon the processing result; and providing, via the network, the result information to the mobile device application executing on the mobile computing device. The first computing device may be the third computing device.

The method may further include providing, to the second computing device, an indication of a processing type, where the processing type is associated with the encrypted data, and the service provider manages processing of the decrypted data based upon the processing type.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1:
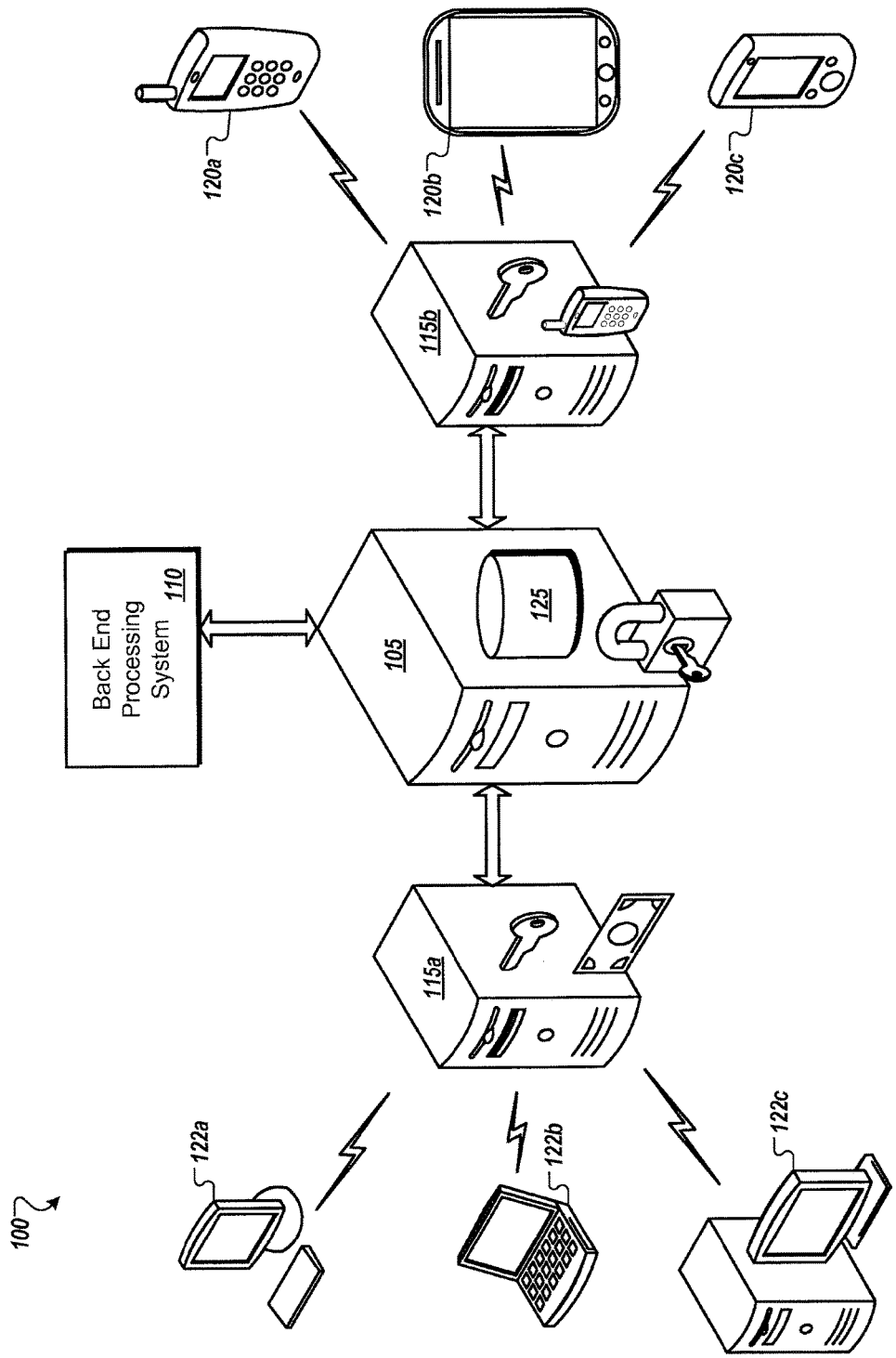
FIG. 1 is a block diagram of an exemplary system enabling client-side encryption of information originating from the client.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

An intermediary party may receive information from an end user. The intermediary party may transmit at least part of the information to a backend service provider for processing.

Access and/or exposure to the information may result in potential liability for the intermediary party.

In general overview, the systems and methods of the present disclosure may enable an entity to obtain information from end users and transfer at least part of the information to backend service providers without exposure to the underlying payload information. The entity or an intermediary party may enable computing devices operated by end users, to encrypt information prior to transmission. The entity may send the encrypted information to backend service providers via an intermediary party, where the information may be decrypted. Because the entity and the intermediary party receives encrypted information, not interpretable, human-renderable, and/or plain text information, the entity may provide assurance to end users that the information is secure. Similarly, the intermediary party may provide assurance to backend service providers that information is secure. Additionally, since the security risks regarding storage of encrypted information may be low, the entity and/or intermediary party may store encrypted information to asynchronously process information received from end users. Overall, the entity, in cooperation with the intermediary party, may alleviate the risk of undesirable exposure to received information by entity's own members, the intermediary party's own members, or third parties that may access the entity's or intermediary party's systems (e.g., hackers), and leverage the gained security to manage information processing.

In some examples, the systems and methods of the present disclosure may be deployed for payment systems. A payment system (e.g., an intermediary party server) may receive encrypted credit card information from an entity, such as a credit card number and credit verification value (CVV), and verify with the credit card company that the card number's user is authorized to make a purchase from the entity. Because the entity cannot access, interpret, or render the credit card information (e.g., as textual information, etc.), the entity may store the encrypted information in long-term memory (e.g., compact disk, hard drive) and still comply with some of the requirements set forth by standards, such as the Payment Card Industry (PCI) Data Security Standard (DSS). In some examples, the systems and methods of the present disclosure may be deployed in health care systems, thereby enabling confidential patient information to be transferred securely among electronic systems. The systems and methods of the present disclosure may be deployed for background investigation services. Confidential information desired for a background check, such as a person's Social Security Number, may be transferred securely among electronic systems until the information reaches an authorized user. Applications for the systems and methods described herein are not limited to the aforementioned examples, but may be deployed in any number of contexts, as would be understood by one of ordinary skill in the art. Contents of the background are not to be considered as an admission of the contents as prior art.

Referring now to FIG. 1, a system 100 for enabling client-side encryption of information originating from the client is shown and described. The system 100 includes an intermediary party server 105 in communication with a back end processing system 110. The intermediary party server 105 may be in communication with entity servers 115a, 115b (collectively, "115"). Each entity server 115 may be in communication with client computing devices, such as mobile computing devices 120a, 120b, 120c and personal computing devices 122a, 122b, and 122c, which may be operated by end users.

In operation, entities may hold accounts with the intermediary party. In some implementations, the intermediary party may provide access to a library 125 of security related subprograms that may be executed by a processor on a computing device. The library 125 may contain encryption subprograms for use on client computing devices 120, 122 that may be used to transmit sensitive information. The library 125 of subprograms may be located on or associated with the intermediary party server 105. The entity servers 115 may access the library 125 when logged into their accounts. In some implementations, the entity servers 115 may obtain copies of the library 125 of subprograms through their accounts. The entities may store copies of the library 125 on their respective entity servers 115.

In some implementations, the library 125 of subprograms may be a Javascript library, although libraries with subprograms in other programming languages may be used. In some implementations, the subprograms of the library 125 may be executed in web browsers, such as Mozilla Firefox™ offered by Mozilla Corporation of Mountain View, Calif.; Google Chrome™ offered by Google, Inc. of Mountain View, Calif.; or Safari™ offered by Apple Inc. of Cupertino, Calif. In some implementations, the subprograms of the library 125 may be included within mobile device applications provided by the entity for installation by a user (e.g., on a smart phone, tablet computer, or other mobile computing device).

In some implementations, each entity account may include a copy of a public key of a keypair usable with an asymmetrical encryption algorithm (e.g., RSA, Diffie-Hellman key exchange protocol, Digital Signature Standard (DSS), ElGamal, Paillier). The public key may be available as a base-64 encoded string, a hexadecimal encoded string, or any other format. An entity may copy the public key into any computer program the entity may use. In some implementations, when an entity opens an account with the intermediary party, the intermediary party server 105 may deliver a copy of the public key to the respective entity server 115.

In operation, in some implementations, a user at a client computing device 120, 122 may access a website associated with an entity. The user may visit the Uniform Resource Locator (URL) associated with the entity's website. The client computing device 120, 122 may make a Hypertext Transfer Protocol (HTTP) request over a computer network to access the website.

In response, the entity server 115 may transmit a web page to the client computing device 120, 122 for display. The client computing device 120, 122 may view the web page using a web browser. The web page may include Hypertext Markup Language (HTML).

In some implementations, the entity's web page may include a form. The form may include fields to receive information from a user of the client computing device 120, 122. In some implementations, a portion of the fields may be configured to receive information such as the user's billing address, credit card number, credit card expiration date, and/or credit card security code (e.g., credit verification value, or CVV). In some implementations, a portion of the fields may be configured to receive information such as the user's home address, date of birth, driver's license number, and Social Security number. In some implementations, a portion of the fields may be configured to receive information related to a person's health history. In some implementations, a portion of the fields may be configured to receive information such as a username, account password, and contact information (e.g. mailing address, e-mail address, mobile phone number).

In some implementations, one or more fields may be configured to receive sensitive information. Information may be sensitive if the information is confidential (e.g., industry and/or professional standards indicate that only designated parties should have access to the information). Information may be sensitive if a party incurs regulatory obligations for handling the information due to exposure to the information. Information may be sensitive if a party incurs potential liability due to handling of and/or exposure to the information.

The web page may identify the fields that are configured to receive sensitive information, thereby identifying the fields for which received information should be encrypted. In some implementations, the web page may include HTML identifying fields that are configured to receive sensitive information. In some implementations, the web page may include a script tag. The script tag may identify the library 125 of encryption-related subprograms the web page may use and the location of the library 125. The web page may include a copy of the public key provided by the intermediary party server 105.

The web page may include a control that a user may activate to submit information provided in the form's fields to the entity server 115 (e.g., a "Submit" button). A process subprogram from the library 125 may begin executing in the web browser on the client computing device 120, 122 in response to the activation of the submission control. The process subprogram may hook into the web page's submission process.

In some implementations, the process subprogram may obtain a value from a random number generator (e.g., a generator available through an open source library). The process subprogram may process the value to obtain an encryption key for use with a symmetrical encryption algorithm, such as Advanced Encryption Standard (AES) or Data Encryption Standard (DES). The web page may access an encryption subprogram from the library 125 to encrypt the values in fields that may receive sensitive information using the encryption key (also referred to herein as "symmetrical encryption key").

In some implementations, the web page may include two forms with the same fields. One of the forms may be hidden from the user (e.g., not displayed). The information in the hidden form may be the information to be transmitted to the entity server 115. HTML in the displayed form may indicate if the field is configured to receive sensitive information. The process subprogram may analyze the HTML to identify field values for encryption. If a field is not configured to receive sensitive information, values in the field may be copied to the corresponding field on the hidden form. If a field is configured to receive sensitive information, values in the field may be encrypted and the encrypted values may be inserted in the corresponding field on the hidden form. In some implementations, a user of the client computing device 120, 122 may not see entered values change to their encrypted counterparts, which may avert alarm or confusion on the part of the user.

In some implementations, the web page may include a single form. The form may have hidden fields corresponding to the fields that receive sensitive information. In some implementations, only one of a hidden field or its corresponding visible field may be activated (e.g., if the visible field is active, the hidden field may not be configured to receive a value, and vice versa). The encryption subprogram from the library 125 may encrypt a value in a field that receives sensitive information. The process subprogram may deactivate the field, activate the corresponding hidden field, and insert the encrypted value in the hidden field. The visible field may appear, e.g., grayed out. In some implementations, a user of the client computing device 120, 122 may not see entered values change to their encrypted counterparts.

In some implementations, the web page may include a form that may be hidden and/or disabled. The web page may include code that may display and/or enable the form. In some implementations, if the web browser on a client computing device 120, 122 cannot execute the code that displays and/or enables the hidden form (e.g., cannot run Javascript), the form may remain hidden and/or disabled. In some implementations, web browsers that cannot execute code in a particular programming language may not be capable of receiving a web page by which a user may enter sensitive information (e.g., credit card number). In some implementations, the web page may include a noscript tag indicating that the ability to execute a particular programming language is required.

An encryption subprogram from the library 125 may encrypt the symmetrical encryption key according to an asymmetrical encryption algorithm (e.g., RSA). The encryption subprogram may be configured via receipt of the public key in the web page. The web page may send the symmetrical encryption key to the encryption subprogram to be encrypted using the public key.

The web page may encode the encrypted values from the fields, the unencrypted values from the fields, and the encrypted symmetrical encryption key. In some implementations, the web page may encode the information by serializing the information. Exemplary formats for serialization may include base 54 or hexadecimal (base 16), although other formats may be used. The client computing device 120, 122 may send the information to the entity server 115.

In other operations, the client computing device 122 (e.g., mobile device) may download and install a mobile device application including algorithms for providing user information and other data to one of the entity servers 115. For example, the user may download a mobile device application for purchasing products from a particular merchant entity maintaining the entity server 115. The mobile device application, in this circumstance, may include one or more algorithms for encrypting sensitive information for transmission to the entity server 115 (as described above in relation to the web browser based model). For example, the mobile device application may include a public key and/or encryption algorithm allocated to the merchant from the intermediary server 105 (e.g., from the library 125). In other implementations, the mobile device application may contain code for retrieving information, such as an encryption algorithm and/or public key information, from the intermediary server 105. The mobile device application may receive data from a user, encrypt at least a portion of the information, and supply the information to the entity server 115 in a similar manner as described above in relation to the browser based model.

The entity server 115 may store information received from client computing devices 120, 122. In some implementations, the entity server 115 may not receive sensitive information in interpretable, readable, and/or renderable form (e.g., plain text). Storing the encrypted information in persistent memory (e.g., hard drive, compact disk) presents fewer security risks and may remain within information security standards. Thus, the entity server 115 may not be compelled to send the information to the backend system 110 immediately for processing.

Storage of end user information may enable asynchronous processing. For example, the entity server 115 may place encrypted information in a queue and determine the order in, which information from users may be processed (e.g., priority, or other metrics). Thus, the client-side encryption may result in greater flexibility for entity servers 115 to manage information received from client computing devices 120, 122.

The entity server 115 may send information from the client computing device 120, 122 to the intermediary party server 105 for processing. The entity server 115 may indicate the type of processing to be performed on the information. In some implementations, the entity server 115 may send the information via an HTTP request, such as a POST request. In some implementations, the entity server 115 may make an application programming interface (API) call to the intermediary party server 105.

In some implementations, the intermediary party server 105 may include a copy of the private key of the key pair, usable with an asymmetrical encryption algorithm, which corresponds to the public key the intermediary party server 105 has provided to account holders (e.g., entity servers 115). The intermediary party server 105 may decrypt encrypted data (e.g., values from the form fields or values collected by the mobile application) using the private key. In some implementations, the encrypted values may not be decrypted without the private key. In some implementations, neither the client computing devices 120, 122 nor the entity servers 115 have access to the private key.

With access to interpretable (e.g., renderable, plain text, etc.) versions of all information received via the form, the intermediary party server 105 may process the information.

Processing may create a result. In some implementations, the intermediary party server 105 may communicate with the back end processing system 110 (e.g., associated with a third party) to process the information.

For example, the intermediary party server 105 may communicate with the backend processing system 110, such as, e.g., a credit card company's server, to authorize use of the credit card number for a requested dollar amount (e.g., the price of a good or service). If the credit card number used is authorized by the credit card company's server, the intermediary party server 105 may return a result of "approved" to the entity server 115. If the number is not authorized, the intermediary party server 105 may return a result of "denied." In some implementations, the result may include a reason for the denial (e.g., insufficient funds, invalid credit card number, invalid CVV).

In another example, the intermediary party server 105 may communicate with the backend processing system 110, such as, e.g., background investigation service to verify the identity of a person. The intermediary party server 105 may decrypt information. In some implementations, the intermediary party server 105 may send identifying information in plain text to a server for a background investigation service. In some implementations, the intermediary party server 105 may encrypt identifying information according to an encryption algorithm used to secure information between the intermediary party server 105 and the backend processing system 110.

In some examples, the intermediary party server 105 may send the person's name, residential addresses for the past 5 years, Social Security number, back account numbers, and driver's license number to the back end processing system 110 for background investigation service. The back end processing system 110 may determine that the received information is consistent with the information stored in its database for the person and return a result of "verified" to the intermediary party server 105. If the received information is inconsistent with the database information, the background investigation service may return a result of "unverified."

In any of these examples, the intermediary web server 105 may send the result from the backend processing system 110 (e.g., credit card company server, background investigation server) to the entity server 115. The entity server 115 may send a web page with the result or an indication of the result (e.g., verified/not verified, authorized/not authorized) for display on the client computing device 120, 122. In some implementations, the entity server 115 may log the information with an account of the user (e.g., accessible using the mobile application installed upon the client computing device 122). For example, the entity server 115 may cause an alert mechanism to alert the user of the client computing device 122 of the result information.

The entity server 115 may flexibly determine when and how information shall be collected (e.g., number of forms, information to be collected via any given form or mobile application information entry page, organization of information to be collectively obtained through the forms or mobile application information entry pages, etc.) and which information shall be encrypted. In some implementations, after the entity server 115 receives information from a browser form or mobile application, the entity server 115 may send another form to the client computing device 120, 122 or cause the presentation of another information entry page within the mobile application. The form or entry page may contain different fields requesting different information from the previously sent form.

In the circumstance of an HTML form, the form may include HTML tags or coding flags identifying different fields that may receive sensitive information. For example, the entity server 115 may send a form for registering a user with the website. The entity server 115 may send a different form to enable receipt of the user's payment information for a good and/or service. In the circumstance of a mobile application, the data entry pages may be configured to identify information fields designated to receive sensitive information. In some implementations, at least a portion of the information may be auto-filled using stored data. For example, user data may be collected using web browser cookies or retrieved from a user account associated with a mobile device application. Alternatively, based upon user-supplied information (e.g., username and password, etc.) a portion of the form or mobile application data entry fields may be auto populated by the entity server 115 with stored user information.

Figure 2A:
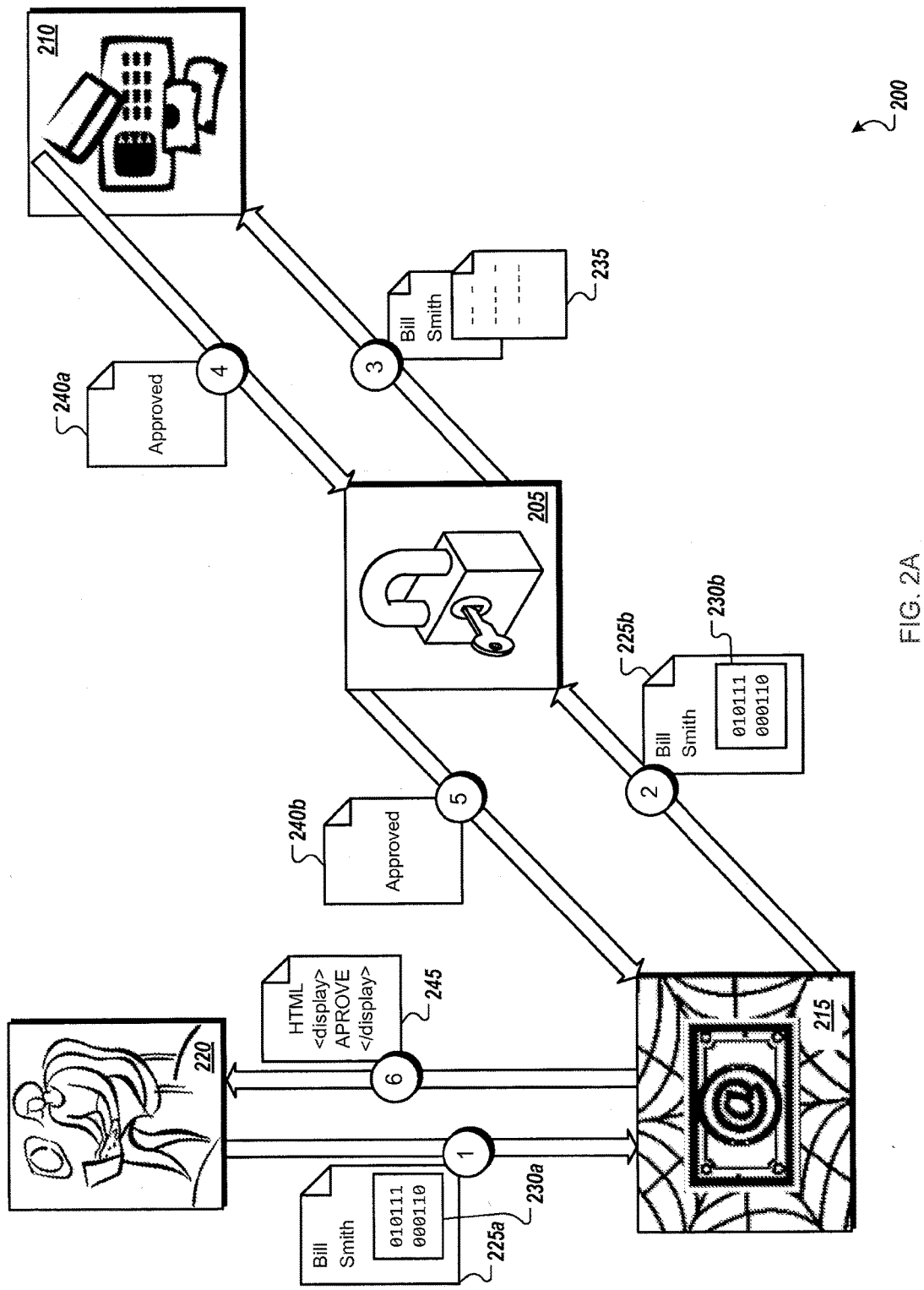
FIG. 2A is a block diagram of an exemplary system for enabling client-side encryption of information originating from the client in a payment processing context.

Referring now to FIG. 2A, a block diagram of an exemplary system 200 for enabling differential client-side encryption of information originating from the client in a payment processing context is shown and described. In operation, a client computing device 220 controlled by a customer may be used to order a good and/or service from an entity via a network. While placing the order, the customer may enter information into a form on a web page. The form may include fields for the customer's name, telephone number, shipping address, billing address, credit card number, and card verification value, by way of example.

The customer may activate a control to submit form data 225 to an entity server 215 (e.g., a merchant server). Upon activation of the control, an encryption subprogram accessed by the web browser may execute on the client computing device 220. In some implementations, the encryption subprogram may encrypt information such as the credit card number and/or the card verification value. In some implementations, the encryption subprogram may not encrypt information such as the customer's name, telephone number, shipping address, and/or billing address.

In some implementations, the web browser may send the form data 225, including the non-encrypted customer's name, telephone number, shipping address, and/or billing address to the entity server 215. The entity server 215 may access and/or store the non-encrypted information in, for example, a persistent memory. In some implementations, the web browser may send, within the form data 225, encrypted information 230, such as credit card information, to the entity server 215. The entity server 215 may access and/or store the encrypted information 230, for example, in a persistent memory. In some implementations, the entity server 215 may store the encrypted information 230 on a hard drive or compact disk, by way of example.

Because the entity server 215 lacks the encryption key to decrypt the encrypted information 230, the entity server 215 may not obtain plain text values of the encrypted information 230. In some implementations, the inability to access plain text values of credit card information may enable the entity server 215 to store the encrypted information 230 without concern that the encrypted information 230 may be decrypted and recovered by an unauthorized party.

The entity server 215 may send the form data 225, including at least a portion of the non-encrypted information as well as the encrypted information 230 to an intermediary party server 205 (e.g., a payment gateway). The intermediary server 205 may run the transaction for the ordered good and/or service. For example, the intermediary server 205 may determine if the customer can make the payment for the good and/or service. The intermediary server 205 may recover the credit card information from the encrypted information 230 by decrypting the encrypted credit card information. The intermediary server 205 may request that a backend processing system 210 (e.g., a credit card company server in a credit card network) determine whether the customer may use the credit card information for the amount in the order. For example, the intermediary server 205 may forward credit card data 235 to the backend processing system 210. In some implementations, the credit card data 235 may be encrypted and/or supplied to the backend processing system 210 via a secure information, for example to protect the credit card data 235 from unauthorized access.

The backend processing system 210 may receive the credit card data 235 and analyze the credit card data 235 to determine whether the customer may use the credit card information for the amount in the order. The backend processing system 210 may send a verification result 240*a* (e.g., approved, denied, etc.) back to the intermediary server 205. The intermediary server 205 may forward the verification result 240*b* result obtained from the backend processing system 210 to the entity server 215. The entity server 215 may format the verification result 240*b* for display at the client computing device 220. For example, the entity server 215 may provide web page information 245 containing the verification result 240 for review by the customer on the client computing device 220.

Figure 2B:
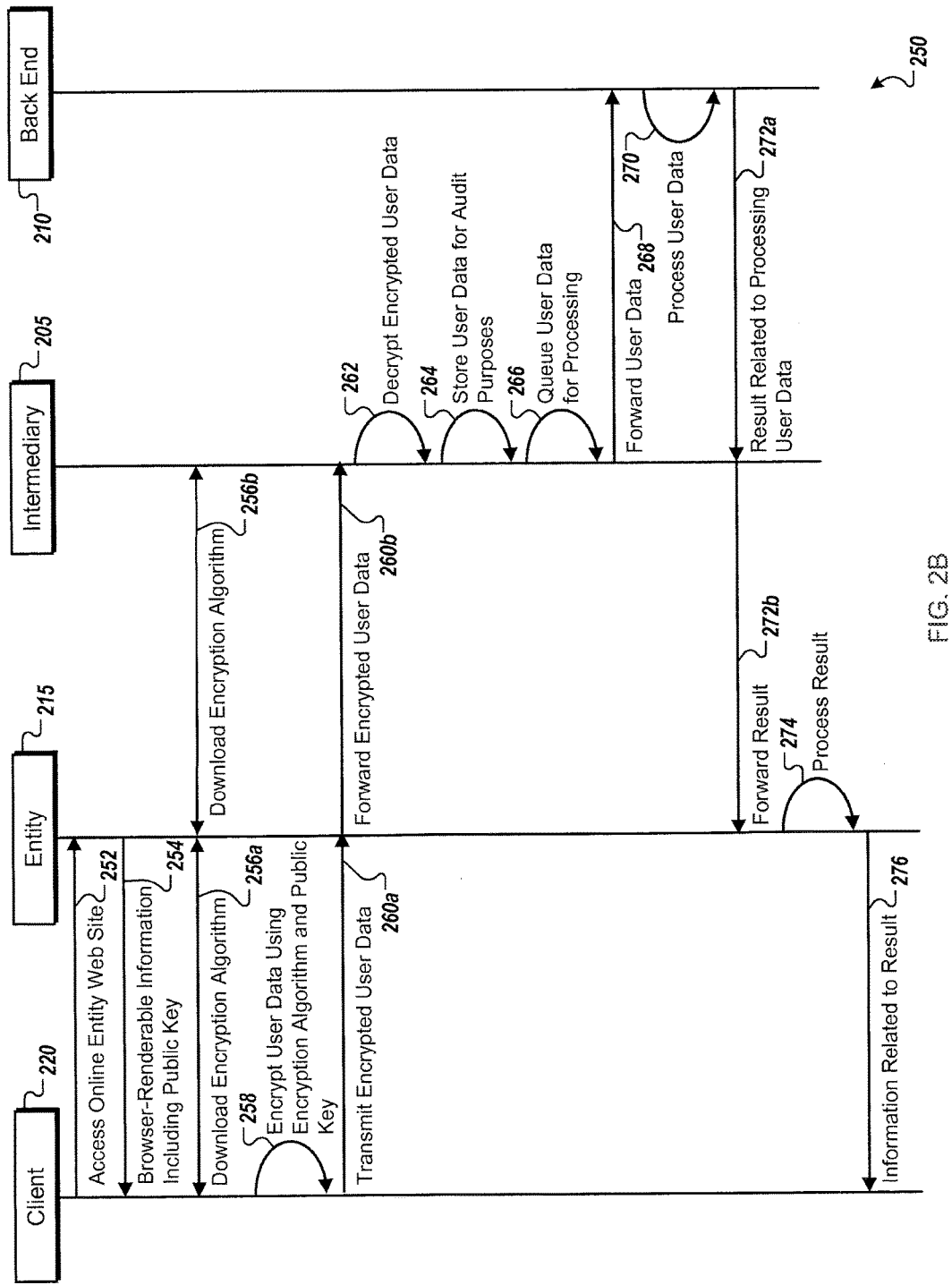
FIG. 2B is a swim lane diagram of an example operation flow through a system, such as the system of FIG. 2A, for enabling client-side encryption.

FIG. 2B is a swim lane diagram of an example operation flow 250 through a system, such as the system of FIG. 2A, for enabling client-side encryption. The operation flow 250 illustrates example information passed between the intermediary server 205, entity server 215, client computing device 220, and back end processing server 210, as described in relation to FIG. 2A. In some implementations, the operation flow 250 may be used to process and verify payment information for an online vendor. The operation flow 250, in some implementations, may be used to process and authenticate patient information in a health information network. In some implementations, the operation flow 250 may be used to process and verify background information for investigation purposes.

In some implementations, the operation flow 250 begins with accessing, through a web browser executing upon a client computing device 220, an online entity website (252). For example, a user may browse to the website using a web browser application. The user may access the website, for example, to request information (e.g., patient information, background check information, etc.). In other examples, the user may access the website to purchase goods or services.

In response to accessing a request form web page (e.g., order page, patient information page, personal information identification page, etc.), the entity server 215, in some implementations, provides browser-renderable information including a public key for encryption of sensitive information (254). The browser-renderable information, for example, may include a fillable form, or a pair of fillable forms including a visible form and a hidden form. At least a portion of the fields of the fillable form, for example, may be configured to receive sensitive information.

In some implementations, the browser-renderable information includes instructions for downloading an encryption algorithm provided by the intermediary server 205. In some implementations, the client computing device 220 downloads the encryption algorithm (256) from the intermediary server 205 via the online entity server 215. In other implementations, the client computing device 220 downloads the encryption algorithm directly from the intermediary server 205 (not illustrated). Although illustrated as being performed after receiving the browser-renderable information including the public key, in some implementations (not illustrated), the web browser 220 may have previously received the encryption algorithm from the intermediary server 205. For example, the client computing device 220 may have received the encryption algorithm upon logging into a user account associated with the entity server 215. The encryption algorithm, in some implementations, may be associated with the public key. For example, the intermediary server 205 may associate a particular encryption algorithm with a particular public key allocated to a particular entity.

In some implementations, the client computing device 220 (e.g., within scripting language or other browser-executable language executing within a browser application) encrypts user data using an encryption algorithm and the public key (258). For example, the encryption algorithm may be programmed into a browser-executable language such as Javascript programming language. In some implementations, the encryption algorithm identifies one or more fields configured to accept sensitive information and encrypts the information entered into those fields.

In some implementations, the client computing device transmits data, including the encrypted data, to the entity server 215 (260*a*). The encryption algorithm or another algorithm, for example, may transmit data to the entity server 215. The encrypted data, in some implementations, is provided to the entity server 215 separately from unencrypted data (e.g., in a separate transmission). In addition to encryption, in some implementations, encrypted and, optionally, unencrypted data may be provided to the entity server 215 from the client computing device 220 via a secure connection, such as a Secure Socket Layer (SSL) connection.

In some implementations, the entity server 215 forwards the encrypted data and, optionally, a portion of the unencrypted data (e.g., identification information such as a user name and zip code, etc.) to the intermediary server 205 (26*b*). Rather than immediately forwarding data, in some implementations, the entity server 215 queues the encrypted data for later transmission to the intermediary server 205. In addition to forwarding the encrypted data, in some implementations, the entity server stores a copy of the encrypted data locally, for example as a temporary backup in case the initial request to the intermediary server 205 fails or for transaction history purposes. If the entity server 215 stores the encrypted data locally, in some implementations the entity server 215 stores the information within a secure storage region, such as a secure database.

At the intermediary server 205, in some implementations, the encrypted data is decrypted (262). The intermediary server 205, for example, may match the online entity with a private key that is paired with the public key issued to the entity server 215. In some implementations, the private key is identified based in part upon a transmission signature of the entity server 215 (e.g., internet protocol (IP) address, domain name server (DNS) name, etc.). The private key, in some implementations, is identified based in part upon header information contained within the transmission from the entity server 215. For example, a transmission algorithm may embed identifying information within the transmission provided by the entity server 215 to the intermediary server 205 (e.g., in step 260*b*). In some implementations, the public key itself or an identifier identifying the public key is transmitted with the encrypted information.

Upon decryption of the encrypted information, in some implementations, the intermediary server 205 stores at least a portion of the information (264). The information may be stored, for example, for audit purposes.

The data, in some implementations, is queued for data processing (266). Depending upon the type of data (e.g., credit card information, patient information, background verification information, etc.) the data may be queued to one of a number of back end servers, including the back end server 210. The back end server 210, in some examples, may be a medical system server, credit card server, electronic payment processing server, law enforcement server, or government bureau server.

At some point in time, in some implementations, the data is forwarded by the intermediary server 205 to the back end server 210 for processing (268). In some implementations, the data is encrypted prior to transmission to the back end server 210. The data, in some implementations, is provided to the back end server 210 via a secure transmission or via a secure network connection.

In some implementations, at the back end server 210, the data is processed (270) to obtain a result. Depending upon the type of data and/or the type of the back end server 210, the result may vary. For example, if the back end server 210 is a credit card payment processing server, the result may include a status message (e.g., approved, denied, etc.).

In some implementations, the back end server 210 provides the result related to processing the user data to the intermediary server 205 (272a). For example, a medical system server may provide a result of "approved" in relation to a request of a patient for clearance for a service, procedure, or medication.

The intermediary server 205, in some implementations, forwards the result to the entity server 215 (272b). In some implementations, the intermediary server 205 stores the result for audit purposes (e.g., along with the user data formerly stored at step 264).

Upon receipt of the result, in some implementations, the entity server 215 processes the result (274). Processing, in some implementations, may include associating the result with a previous request, for example a request for purchase of a good. If, for example, credit card information has been authorized, the entity server 215 may initiate the delivery of the good to the user of the client computing device 220.

In some implementations, based upon the results of processing in step 274, the entity server 215 provides information related to the result to the client computing device 220 (276). For example, upon receiving an indication that credit card information has been denied, the entity server 215 may present a message regarding the denial within the web browser application executing upon the client computing device 220.

Often, a significant amount of time (e.g., minutes, hours, a day, etc.) has lapsed between the transmission of the user data (at step 260a) and processing of the result (at step 274). In this circumstance, rather than providing information related to the result to the client computing device 220 (e.g., within the browser application), in some implementations, the entity server 215 identifies contact information associated with the user (e.g., email address, telephone number for text messaging, social media account information, etc.). The entity server 215, further to the example, may provide information related to the result to the user using the contact information.

Although illustrated as a particular series of steps, in some implementations, more or fewer steps may be implemented, or one or more of the steps may be performed in a different order. For example, in some regions, a credit card payment may not be processed until day of shipment of an order. In this circumstance, the entity server 215 may provide the encrypted user data to the intermediary server 205 (260b) a first time to verify that the credit card information is valid, and a second time (e.g., hours or days later) to initiate processing of payment.

Furthermore, in some implementations, the credit card information, stored at the intermediary server 205, may be accessed for reuse, for example based upon identifying information provided during a subsequent transaction. For example, a shopper, upon making a subsequent purchase, may select an "on record" credit card within a payment form (e.g., fillable form including sensitive and public data). In some implementations, the subsequently transmitted user data (e.g., sent from the client computing device 220 to the entity server 215, where it is forwarded to the intermediary server 205) may include a portion of a credit card number (e.g., banking information number (BIN) plus the last four digits), or a flag, tag, or code recognized by the entity server 215. For example, within the browser-renderable information provided within step 254, the entity server 215 may supply the client computing device 220 with partially encoded credit card information usable to identify a particular "on file" credit card (e.g., American Express card with last four digits 7890). Upon selection of the "on file" credit card, the user data transmitted at step 260a may include the text American Express and 7890 or another identifier code (e.g., unique identifier) used to identify the selected "on file" credit card. The entity server 215, in response, may forward information used to identify the "on file" credit card to the intermediary server 205 at step 260b. The intermediary server 205 may use the identifying information to retrieve archived credit card information. Alternatively, the entity server 215 may archive the encrypted credit card information and forward the (still encrypted) credit card information to the intermediary server 205 in response to recognizing the "on file" credit card identification information received in the transmitted user data in step 260a. Other modifications of the operation flow 250 are possible.

Figure 3:
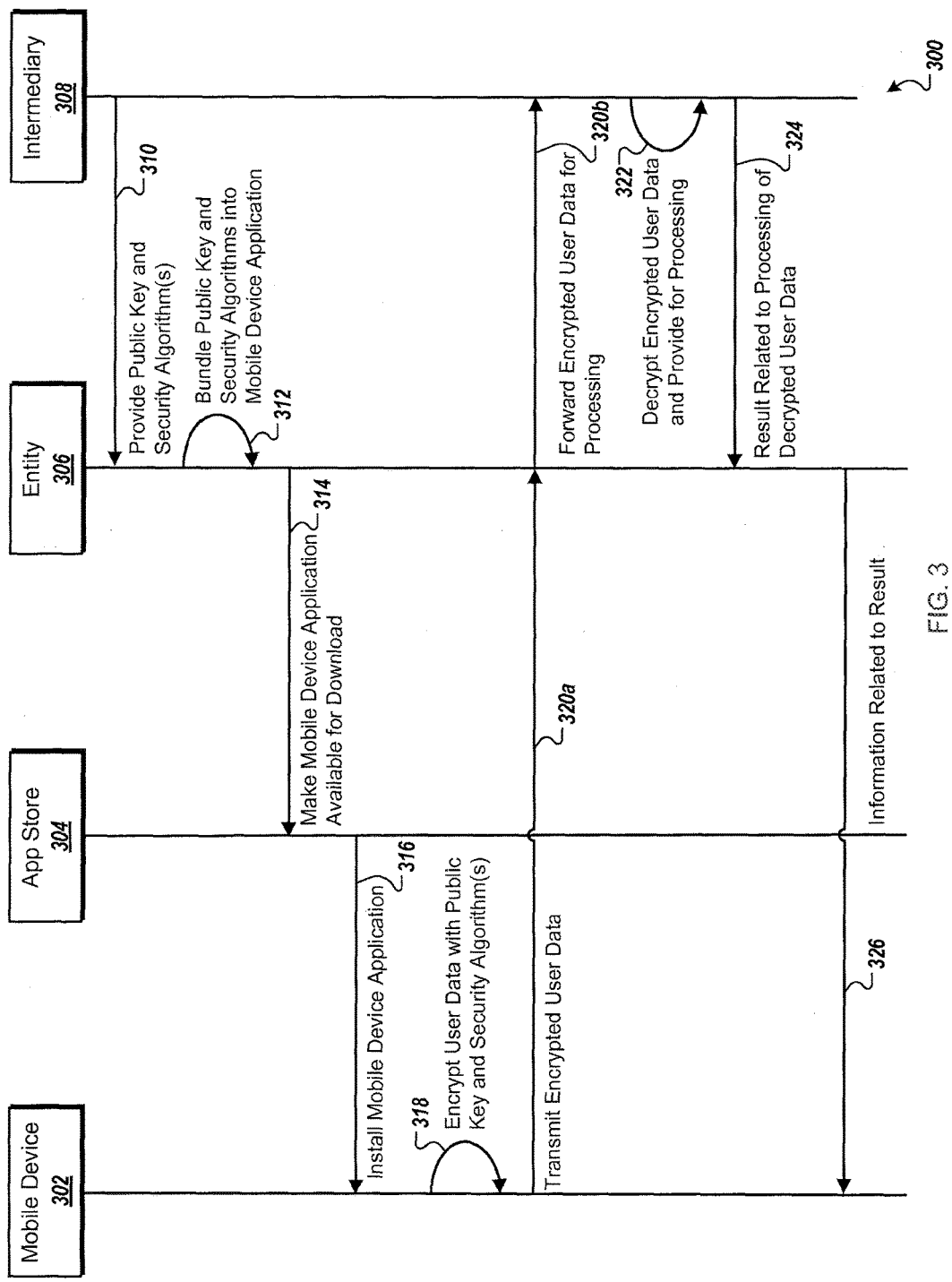
FIG. 3 is a swim lane diagram of an example operation flow for providing and using a wireless computing device application that enables client-side encryption of information.

FIG. 3 is a swim lane diagram of an example operation flow 300 for providing and using a wireless computing device application that enables client-side encryption of information. The operation flow 300 illustrates example information passed between a mobile computing device 302 (e.g., such as the client computing devices 122 described in relation to FIG. 1), an application store 304, an entity server 306 (e.g., such as the entity servers 115 described in relation to FIG. 1), and intermediary server 308 (e.g., such as the intermediary server 105 described in relation to FIG. 1). In some implementations, the operation flow 300 may be used to provide and utilize a mobile application affiliated with an online vendor for purchase of goods and services as processed via the entity server 306. The operation flow 300, in some implementations, may be used to provide and utilize a mobile application affiliated with a health care system for authentication of patient information in a health information network. In some implementations, the operation flow 300 may be used to provide and utilize a mobile application affiliated with a law enforcement system for verification and background information for investigation purposes.

In some implementations, the operation flow 300 begins with the intermediary server 308 providing the entity server 306 with a public encryption key and one or more encryption algorithms (310). The public encryption key, for example, may be paired with a private encryption key, maintained by the intermediary server 308. The public encryption key, for example, may be used to encrypt data using one or more of the encryption algorithms. At the intermediary server, the encrypted data may be decrypted using the paired private encryption key and one or more decryption algorithms maintained by the intermediary server 308. In some implementations, the public key is unique to the entity server 306. For example, the intermediary server 308 may allocate a different public key to each entity utilizing the services of the intermediary server 308 for secure transmission and processing of sensitive data.

In some implementations, the entity server 306 may bundle the public key and at least one of the security algorithms provided by the intermediary server 308 into a mobile device application (312). For example, a developer, supplied with the public key and one or more security algorithms, may incorporate encryption algorithms within an application for the collection and secure transmission of user data. Alternatively, the mobile device application may be configured to request one or more of a public encryption key and a security algorithm from the entity server 306 or the intermediary server 308 at time of encryption of sensitive data.

Upon development of the mobile device application, the entity may provide the mobile application for user consumption at an application store (314). For example, a mobile device application developed for the iPhone™ platform may be made available for download through the Apple application store, while a mobile device application developed for the Android™ platform may be made available for download through the Google application store. In other implementations, an application may be available for direct download and installation, for example via the entity server 306.

An end user may download the entity application from the application store 304 for installation upon the mobile computing device 302 (316). For example, an entity may provide information upon a website for a user to download an application. The application, in some examples, may be an application for shopping with a merchant entity, an application for managing patient information via a healthcare organization entity, or an application for managing background information of candidates via a human resources support entity.

As a user interacts with the installed mobile device application using the mobile computing device 302, in some implementations, a user may enter sensitive information for transmission to the entity server 306. For example, the user may be presented with a user interface including one or more information fields for entering data related to an order, information request, or authentication request. Prior to providing the information to the entity server 306, the mobile computing device, in some implementations, encrypts at least a portion of the data with the public key and at least one of the security algorithms previously provisioned to the entity server 306 by the intermediary server 308 (318).

In some implementations, the encrypted data is transmitted from the mobile computing device 302 to the entity server 306 (320a). The mobile device application, in some implementations, is programmed to communicate with the entity. The encrypted data, for example, may be provided via a secure or insecure transmission to the entity server 306.

The entity server 306, in response, may forward at least a portion of the user data, including the encrypted data, to the intermediary server 308 (320b). The intermediary server 308 may decrypt the user data, for example using the private encryption key and decryption algorithm (322). As described earlier in relation to steps 262 through 272a of FIG. 2B, for example, the data may be stored for audit purposes and provided to a back end server for processing. The back end server may supply a result to the intermediary server 308 related to the processing of the previously encrypted data.

In some implementations, the intermediary server 308 supplies the result related to the processing of the data to the entity server 306. The result, for example, may be identified for recognition by the entity server 306 using a transaction identifier, a portion of the user information, or an identifier related to the end user of the mobile computing device. For example, upon forwarding the encrypted user data for processing (320b), the intermediary server 308 may receive a unique transaction identifier. Alternatively, in response to the receipt of the encrypted user data, the intermediary server 308 may supply the entity server 306 with a unique transaction identifier related to the encrypted data.

In some implementations, information related to the result may be provided to the mobile account of the end user (326). For example, using the mobile computing device 302, the end user may receive the result information via the mobile device application.

Although illustrated as a particular series of steps, in some implementations, more or fewer steps may be implemented, or one or more of the steps may be performed in a different order. Other modifications of the operation flow 300 are possible.

Figure 4:
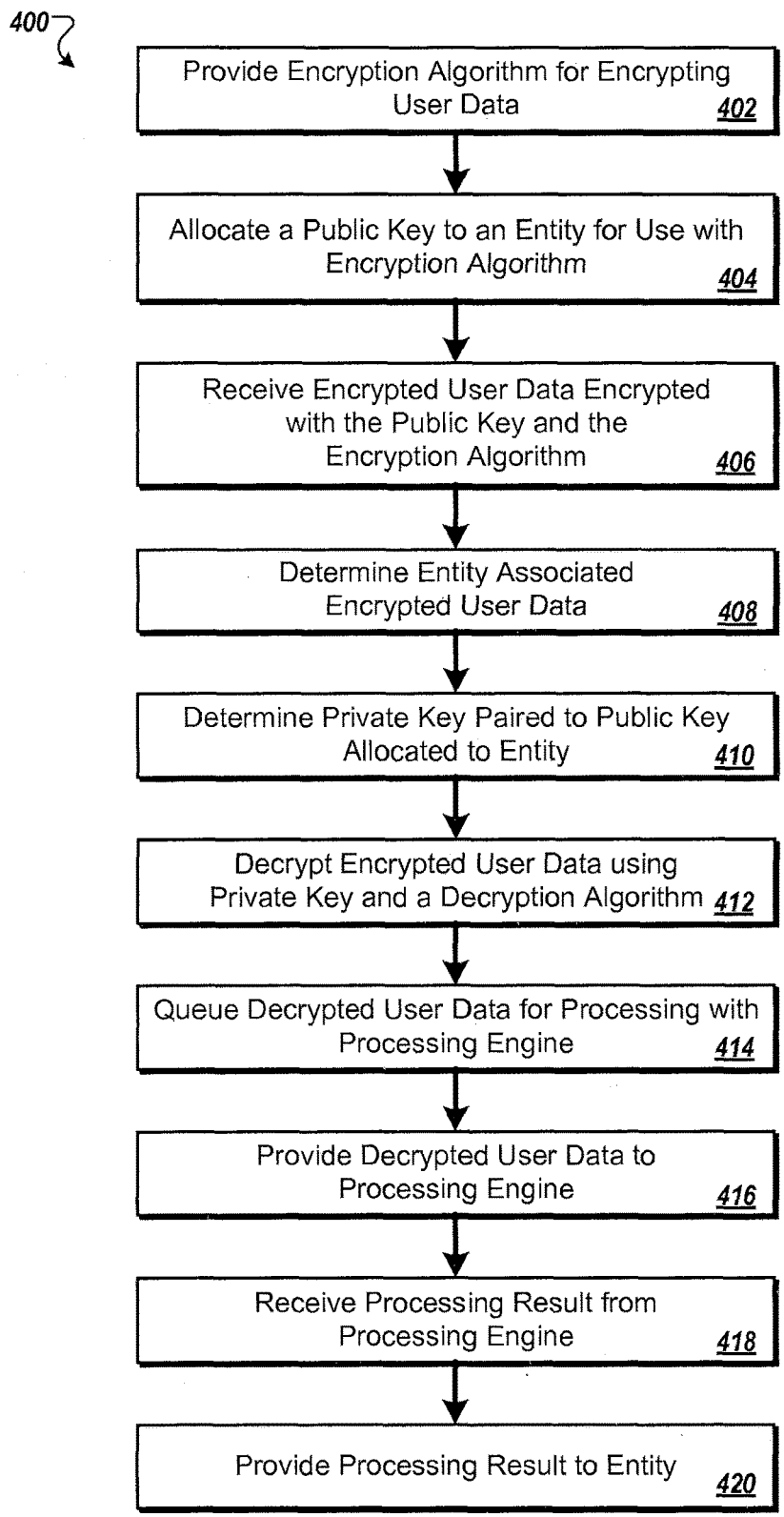
FIG. 4 is a flow chart of an example method for enabling client-side encryption of information originating from the client.

FIG. 4 is a flow chart of an example method 400 for enabling client-side encryption of information originating from the client. The method 400, for example, may be implemented by an intermediary server such as the intermediary server 105 described in relation to FIG. 1.

In some implementations, the method begins with providing an encryption algorithm for encrypting user data (402). The encryption algorithm, for example, may be provided to an entity for use in encrypting sensitive information.

In some implementations, a public key is allocated to an entity for use with the encryption algorithm (404). The public key, for example, may be used in combination with the encryption algorithm. In some implementations, the public key is paired with a private key maintained by the allocator (e.g., the intermediary server).

In some implementations, encrypted user data encrypted with the public key and the encryption algorithm is received (406). The entity server, for example, may forward encrypted data encrypted upon a client computing device using the encryption algorithm and the public key. In some implementations, the unencrypted user data may be included in the same transmission as the encrypted user data.

In some implementations, the entity associated with the encrypted user data is determined (408). An identifier identifying the entity may be provided within the transmission of the encrypted user data, for example (e.g., within the transmission packet header or within unencrypted data provided with the encrypted data). In another example, the entity may be identified by the source of the transmission (e.g., an internet protocol (IP) address, a DNS server, etc.). The public key or an identifier corresponding to the public key, in some implementations, is provided with the encrypted user data. The entity or the private key associated with the entity may be identified based upon the public key.

In some implementations, a private key associated with the entity is determined (410). In some implementations, a single public key has been allocated to the entity. In this circumstance, the entity identified in step 408 may be used to uniquely identify the private key. If two or more public keys have been allocated to an entity, in some implementations, additional information may be analyzed to identify the private key. For example, a source of the information (e.g., mobile device application versus web page) a type of processing requested (e.g., credit card processing versus individual background verification, etc.) or a source of the transmission of the information (e.g., entity gateway, IP address, DNS name, etc.) may be considered when identifying a private key matching the processing request.

In some implementations, the encrypted user data is decrypted using the private key and a decryption algorithm (412). The decrypted data, in some implementations, may be stored for audit purposes.

In some implementations, the decrypted user data is queued for processing with a processing engine (414). For example, based upon a source of the information, an entity associated with the information, and/or an identifier within the transmission associated with a type of processing requested, the decrypted user data may be queued for processing with one or more back end processing servers. In some implementations, the back end processing system is owned by a third party, for example a credit card company.

In other implementations, the intermediary server and the back end processor are controlled by a same entity. If the back end processor is available immediately, the decrypted user data may be transmitted for processing rather than being queued.

In some implementations, the decrypted user data is provided to the processing engine (416). In some implementations, a portion of unencrypted user data, transmitted with the encrypted user data, may be supplied to the processing engine as well, for example to be used as identifying information to provide context to the request (e.g., name, zip code, etc.). The decrypted user data, in some implementations, is provided to the processing engine in a secure transmission. Prior to providing the decrypted user data to the processing engine, for example, the data may be encrypted in a format recognizable by the processing engine. In another example, the decrypted user data may be provided to the processing engine over a secure communication connection.

In some implementations, a processing result is received from the processing engine (418). Information contained within the result may vary, from a boolean (e.g., approved/denied, etc.) to a rich media response (e.g., image data of fingerprints, photograph, text data, etc.). The result may vary, for example, based upon the type of processing requested. The processing result may be received in real time (e.g., shortly after the decrypted user data has been provided to the processing engine) or at a later time. In some implementations, the transmission including the result is identifiable based upon one or more of a transaction identifier, user identifier, entity identifier, and/or request timestamp. In some implementations, upon receiving the processing result, the processing result is matched to a particular processing request.

In some implementations, the processing result is provided to the entity (420). In some implementations, in matching the processing result to the processing request, a response method may be identified for relaying the information to the requesting entity. For example, the entity may have a dedicated server, gateway, transmission code, transmission style, or other preference for receiving the processing result. In some implementations, the processing result or an indication of availability of the processing result may be emailed, issued by facsimile, or logged in an account maintained for the entity by the intermediary system. In some implementations, a portion of the request information may be provided in the transmission containing the processing result, for example to enable matching between the processing result and the request at the entity.

In addition to providing the processing result, in some implementations, the method 400 may include storing the processing result, information regarding the processing result (e.g., timestamp of receipt, timestamp of forwarding to entity, indication of success of forwarding to entity, etc.) within a long term storage area. This information may be stored, for example, for audit purposes.

Although illustrated as a particular series of steps, in some implementations, more or fewer steps may be implemented, or one or more of the steps may be performed in a different order. Other modifications of the operation flow 400 are possible.

Figure 5:
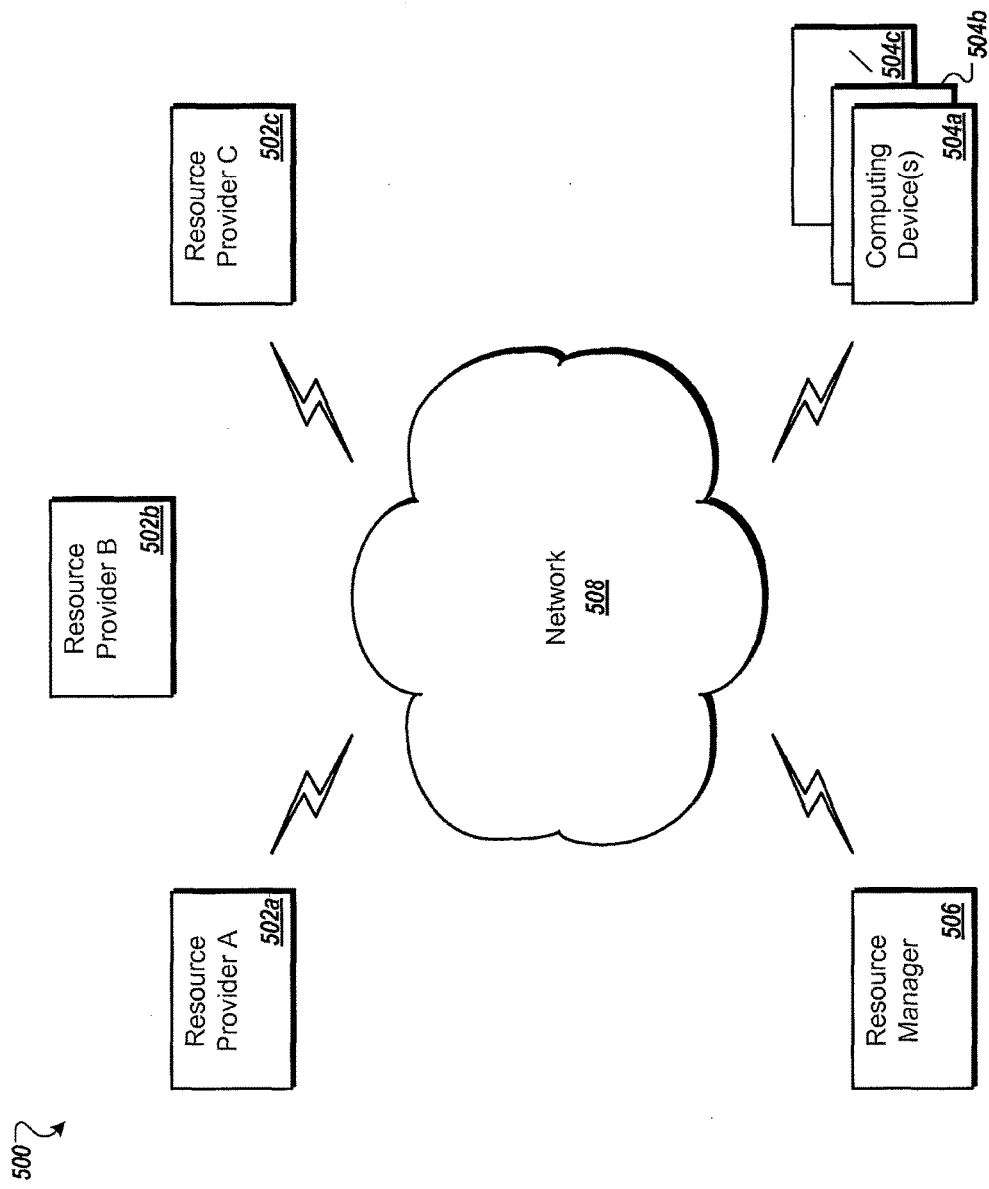
FIG. 5 is a block diagram of an example network environment for collecting and manipulating transaction data at point of sale.

As shown in FIG. 5, an implementation of an exemplary cloud computing environment 500 for client side encryption and secure transmission of data is shown and described. The cloud computing environment 500 may include one or more resource providers 502*a*, 502*b*, 502*c* (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508.

Each resource provider 502 may be connected to one or more computing device 504*a*, 504*b*, 504*c* (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

Figure 6:
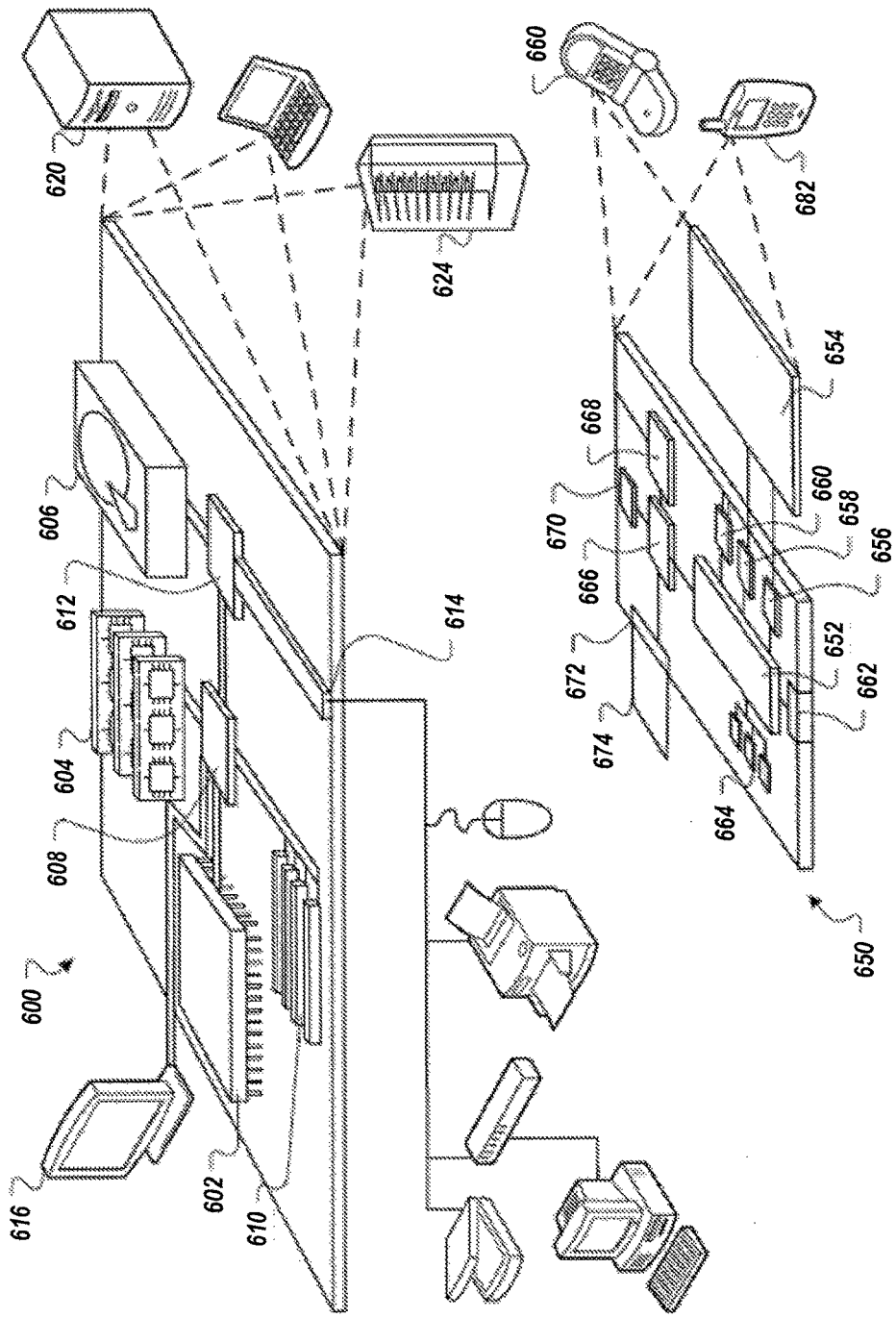
FIG. 6 is a block diagram of a computing device and a mobile computing device.

FIG. 6 shows an example of a computing device 600 and a mobile computing device 650 that can be used to implement the techniques described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations.

Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624.

Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth®, Wi-Fi™, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, an apparatus and method for collecting and manipulating transaction data are provided. Having described certain implementations of methods and apparatus for client side encryption and secure transmission of user data, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A method comprising:
receiving, from an entity server over a network by a computer system comprising one or more hardware processors, a processing request comprising an encrypted data package encrypted by a client device, wherein the encrypted data package comprises an encrypted symmetric key encrypted using a first public key allocated to the entity server and encrypted data encrypted using a symmetric key corresponding to the encrypted symmetric key;
determining, by the computer system, a first private key corresponding to the first public key allocated to the entity server by accessing a plurality of private keys stored in a memory;
decrypting, by the computer system, the encrypted symmetric key using the private key to obtain the symmetric key;
decrypting, by the computer system, the encrypted data using the symmetric key to obtain first data; and
providing, by the computer system, a processing result based on at least a portion of the first data.

2. The method of claim 1, further comprising receiving unencrypted data from the entity server over the network, wherein the unencrypted data is related to the first data, wherein the first data comprises a first type of information associated with the client device and the unencrypted data comprises a second type of information, and wherein the processing result is provided further based on at least a portion of the unencrypted data.

3. The method of claim 1, further comprising:
providing the portion of the first data to a processing server for processing the first data; and
receiving the processing result from the processing server.

4. The method of claim 3, wherein the first data comprises payment information associated with a payment request, wherein the processing server is associated with a payment service provider, and wherein the processing result comprises an approval or a denial of the payment request.

5. The method of claim 3, wherein the first data comprises patient information associated with a patient request for a medical service, wherein the processing server is associated with a medical service provider, and wherein the processing result comprises an approval or a denial of the patient request.

6. The method of claim 3, wherein the first data comprises a third type of information, wherein the processing server is associated with a background investigation service provider, and wherein the processing result comprises a verified identity or an unverified identity.

7. The method of claim 1, further comprising storing an association between each private key in the plurality of private keys to a corresponding public key in a plurality of public keys allocated to different entity servers.

8. The method of claim 7, further comprising allocating the plurality of public keys to the different entity servers.

9. The method of claim 1, wherein the first private key is determined based on at least one of an identifier contained in the processing request, a source of the processing request, the public key contained in the encrypted data package, a source of the encrypted data package, or a type of processing requested from the processing request.

10. A system, comprising:
a non-transitory memory;
one or more hardware processors coupled with the non-transitory memory and configured to read instructions from the non-transitory memory to cause the system to perform operations comprising:
receiving, from an entity server over a network, a processing request comprising an encrypted data package encrypted by a client device, wherein the encrypted data package comprises an encrypted symmetric key encrypted using a first public key allocated to the entity server and encrypted data encrypted using a symmetric key corresponding to the encrypted symmetric key;
determining a first private key corresponding to the first public key allocated to the entity server by accessing a plurality of stored private keys;
decrypting the encrypted symmetric key using the private key to obtain the symmetric key;
decrypting the encrypted data using the symmetric key to obtain first data;
determining a processing result based on at least a portion of the first data; and
providing the processing result.

11. The system of claim 10, further comprising receiving unencrypted data from the entity server over the network, wherein the unencrypted data is related to the first data, wherein the first data comprises a first type of information associated with the client device and the unencrypted data comprises a second type of information, and wherein the processing result is provided further based on at least a portion of the unencrypted data.

12. The system of claim 10, wherein the operations further comprise:
providing the portion of the first data to a processing server for processing the first data; and
receiving the processing result from the processing server.

13. The system of claim 12, wherein the first data comprises payment information associated with a payment request, wherein the processing server is associated with a payment service provider, and wherein the processing result comprises an approval or a denial of the payment request.

14. The system of claim 12, wherein providing the processing result comprises transmitting the processing result to the entity server.

15. The system of claim 12, wherein providing the processing result comprises causing transmission of the processing result to a system other than the entity server or client device.

16. The system of claim 10, wherein the operations further comprise storing an association between each private key in the plurality of private keys to a corresponding public key in a plurality of public keys allocated to different entity servers.

17. The system of claim 12, wherein providing the processing result comprises causing a display of at least a portion of the processing result on a display device.

18. The system of claim 10, wherein the first private key is determined based on at least one of an identifier contained in the processing request, a source of the processing request, the public key contained in the encrypted data package, a source of the encrypted data package, or a type of processing requested from the processing request.

19. A non-transitory machine readable medium having stored thereon machine-readable instructions executable to cause a machine to perform operations comprising:
receiving, from an entity server over a network, a processing request comprising an encrypted data package encrypted by a client device, wherein the encrypted data package comprises an encrypted symmetric key encrypted using a first public key allocated to the entity server and encrypted data encrypted using a symmetric key corresponding to the encrypted symmetric key;
determining a first private key corresponding to the first public key allocated to the entity server by accessing a plurality of private keys stored in a memory;
decrypting the encrypted symmetric key using the private key to obtain the symmetric key;
decrypting the encrypted data using the symmetric key to obtain first data; and
providing a processing result based on at least a portion of the first data.

20. The non-transitory machine readable medium of claim 19, wherein the operations further comprise:
providing the portion of the first data to a processing server for processing the first data;
receiving the processing result from the processing server; and
causing display of at least a portion of the processing server on a display device.

* * * * *